United States Patent
Ghosh et al.

(10) Patent No.: US 6,678,523 B1
(45) Date of Patent: Jan. 13, 2004

(54) CLOSED LOOP METHOD FOR REVERSE LINK SOFT HANDOFF HYBRID AUTOMATIC REPEAT REQUEST

(75) Inventors: Amitava Ghosh, Vernon Hills, IL (US); Louay Jalloul, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 631 days.

(21) Appl. No.: 09/705,850

(22) Filed: Nov. 3, 2000

(51) Int. Cl.[7] ................................. H04Q 7/20
(52) U.S. Cl. ..................... 455/442; 455/436; 370/331; 370/394; 714/748; 714/749; 714/746
(58) Field of Search .................. 370/331, 349, 370/394; 455/436, 442; 714/746, 748, 749, 758, 751

(56) References Cited

U.S. PATENT DOCUMENTS

| | | | | |
|---|---|---|---|---|
| 6,145,108 | A | * 11/2000 | Ketseoglou | 714/751 |
| 6,247,150 | B1 | * 6/2001 | Niemela | 714/701 |
| 6,359,877 | B1 | * 3/2002 | Rathonyi et al. | 370/349 |
| 6,421,803 | B1 | * 7/2002 | Persson et al. | 714/752 |
| 6,425,105 | B1 | * 7/2002 | Piirainen et al. | 714/748 |
| 6,438,723 | B1 | * 8/2002 | Kalliojarvi | 714/751 |
| 6,529,561 | B2 | * 3/2003 | Sipola | 375/295 |
| 6,603,796 | B1 | * 8/2003 | Kondo | 375/130 |

FOREIGN PATENT DOCUMENTS

JP 606016 A1 * 12/1993
WO WO 02082108 A1 * 10/2002

OTHER PUBLICATIONS

"Code Combining—A Maximum–Likelihood Decoding Approach for Combining an Arbitrary Number of Noisy Packets". By David Chase, IEEE 1985, pp. 385–393.

* cited by examiner

Primary Examiner—Nay Maung
Assistant Examiner—Sujatha Sharma
(74) Attorney, Agent, or Firm—Lalita W. Pace

(57) ABSTRACT

A method of combining soft-handoff with a hybrid ARQ scheme to maximize throughput and gain in a communications system. After receiving a frame from the MS (110), the BTSs (104 and 106) will process the frame and communicate to the MS over a forward control channel whether the frame contained any errors. If all BTSs communicate that the frame contains errors, the MS will retransmit the same frame to all BTSs with a flush bit set to instruct the BTSs 104 and 106 to combine the retransmitted frame with the original frame. If only some BTSs communicate that the frame contains errors, the MS will transmit the next frame to all BTSs that successfully decoded the frame with the flush bit set to instruct the BTSs to erase the previous frame from memory and not to combine the previous frame with the current frame. The MS will retransmit the frame to the BTSs that did not successfully decode the frame with the flush bit set to instruct the BTSs to combine the previous frame with the retransmitted frame.

21 Claims, 3 Drawing Sheets

200

CLOSED LOOP METHOD FOR REVERSE LINK SOFT HANDOFF HYBRID AUTOMATIC REPEAT REQUEST

FIELD OF THE INVENTION

The present invention relates generally to communication systems and in particular to soft handoff combining hybrid automatic repeat request (ARQ).

BACKGROUND OF THE INVENTION

Interim Standard IS-95-A (IS-95) has been adopted by the Telecommunications Industry Association for implementing CDMA in a cellular system. In a CDMA system, a mobile station communicates with any one or more of a plurality of base stations dispersed in a geographic region. Each base station continuously transmits a pilot channel signal having the same spreading code but with a different code phase offset. Phase offset allows the pilot signals to be distinguished from one another, which in turn allows the base stations to be distinguished. Hereinafter, a pilot signal of a base station will be simply referred to as a pilot. The mobile station monitors the pilots and measures the received energy of the pilots.

IS-95 defines a number of states and channels for communication between the mobile station and the base station. For example, in the Mobile Station Control on the Traffic State, the base station communicates with the mobile station over a Forward Traffic Channel, and the mobile station communicates with the base station over a Reverse Traffic Channel. During a call, the mobile station must constantly monitor and maintain four sets of pilots collectively referred to as the Pilot Set—the Active Set, the Candidate Set, the Neighbor Set, and the Remaining Set. The Active Set are pilots associated with the Forward Traffic Channel assigned to the mobile station. The Candidate Set are pilots that are not currently in the Active Set but have been received by a particular mobile station with sufficient strength to indicate that the associated Forward Traffic Channel could be successfully demodulated. The Neighbor Set are pilots that are not currently in the Active Set or Candidate Set but are likely candidates for handoff. The Remaining Set are all possible pilots in the current system on the current CDMA frequency assignment, excluding the pilots in the Neighbor Set, Candidate Set, and the Active Set.

The mobile station constantly searches a Pilot Channel of neighboring base stations for a pilot that is sufficiently stronger than a threshold value. The mobile station signals this event to the base station using the Pilot Strength Measurement Message. As the mobile station moves from the region covered by one base station to another, the base station promotes certain pilots from the Candidate Set to the Active Set, Neighbor Set to the Candidate Set, and notifies the mobile station of the promotions via a Handoff Direction Message. When the mobile station commences communication with a new base station in the new Active Set before terminating communications with the old base station, a "soft handoff" has occurred. For the reverse link, typically each base station demodulates and decodes each frame or packet independently. It is up to the switching center to arbitrate between the two base station's decoded frames. Such soft-handoff operation has multiple advantages. Qualitatively, this feature improves and renders more reliable handoff between base stations as a user moves from one cell to the adjacent one. Quantitatively soft-handoff improves the capacity/coverage in a CDMA system.

The CDG Phase-II (consortium of service providers that have set requirements for the next phase of wireless communications) requires a high peak rate (>1 Mbps) as well as higher average throughput (approximately 600 kbps) on the reverse link. To achieve these requirements on the reverse link techniques such as hybrid ARQ and Adaptive Modulation and Coding are needed.

Adaptive Modulation and Coding (AMC) provides the flexibility to match the modulation and forward error correction (FEC) coding scheme to the average channel conditions for each user. AMC promises a large increase in average data rate for users that have a favorable channel quality due to their proximity to the base site or other geographical advantage. Enhanced GSM systems using AMC offer data rates as high as 384 kbps compared to 100 kbps without AMC. Likewise, 1.25 MHz CDMA systems can offer downlink peak data rates as high as 5 Mbps through AMC, where 460 kbps was typical without AMC. AMC, however, does have a few drawbacks. AMC is sensitive to measurement error and delay. In order to select the appropriate modulation, the scheduler must be aware of the channel quality. Errors in the channel estimate will cause the scheduler to select the wrong data rate and either transmit at too high a power, wasting system capacity, or too low a power, raising the block error rate. Delay in reporting channel measurements also reduces the reliability of the channel quality estimate due to constantly varying mobile channel. To overcome measurement delay, the frequency of the channel measurement reports may be increased, however, the measurement reports consume system capacity that otherwise might be used to carry data.

Hybrid ARQ (H-ARQ) is an implicit link adaptation technique. Whereas, in AMC explicit C/I measurements or similar measurements are used to set the modulation and coding format, in H-ARQ, link layer acknowledgements are used for re-transmission decisions. There are many schemes for implementing H-ARQ, such as, Chase combining, Rate compatible Punctured Turbo codes and Incremental Redundancy. Incremental redundancy or H-ARQ-type-II is another implementation of the H-ARQ technique wherein instead of sending simple repeats of the entire coded packet, additional redundant information is incrementally transmitted if the decoding fails on the first attempt.

H-ARQ-type-III also belongs to the class of incremental redundancy ARQ schemes. However, with H-ARQ-type-III, each retransmission is self-decodable which is not the case with H-ARQ-type II. Chase combining (also called H-ARQ-type-III with one redundancy version) involves the retransmission by the transmitter of the same coded data packet. The decoder at the receiver combines these multiple copies of the transmitted packet weighted by the received SNR. Diversity (time) gain is thus obtained. In the H-ARQ-type-II with multiple redundancy version different puncture bits are used in each retransmission. The details for how to implement the various H-ARQ schemes are commonly known in the art and therefore are not discussed herein.

H-ARQ combined with AMC can greatly increase user throughputs, potentially doubling system capacity. In effect, Hybrid ARQ adapts to the channel by sending additional increments of redundancy, which increases the coding rate and effectively lowers the data rate to match the channel. Hybrid ARQ does not rely only on channel estimates but also relies on the errors signaled by the ARQ protocol. Currently, the H-ARQ function resides at the BTS while the reverse link soft-handoff is performed at the RNC. Furthermore, base stations can communicate only through the RNC.

Thus there is a need for a method of combining AMC and H-ARQ scheme(s) with soft handoff in the reverse link to maximize system throughput and gain.

SUMMARY OF THE PREFERRED EMBODIMENT

The present invention provides a method of implementing soft handoff using hybrid ARQ scheme(s) to maximize system throughput and gain. In the presently preferred embodiment, the method includes the steps of: providing a plurality of base stations in communication with at least one RNC and in communication with a mobile station; transmitting a frame $P_{n,m}$ from the mobile station to a first of the plurality of base stations and to a second of the plurality of base stations;
at the first and second of the plurality of base stations, processing the frame $P_{n,m}$; and at the mobile station, determining whether to retransmit the frame $P_{n,m}$ or whether to transmit a next frame $P_{n+1,m}$ to the first and second of the plurality of base stations, wherein if the decision is to retransmit frame $P_{n,m}$, transmitting frame $P_{n,m+1}$, and at the first and second of the plurality of base stations, combining frame $P_{n,m}$ with frame $P_{n,m+1}$ using H-ARQ and if the decision is to transmit the next frame $P_{n+1,m}$, transmitting the next frame to the first and second of the plurality of base stations.

DESCRIPTION OF THE PREFERRED EMBODIMENT

Soft-handoff on the reverse link (from the mobile station (MS) to the base station (BTS)) is an essential component of any Code Division Multiple Access (CDMA) system. In a typical IS-95, IS-2000 or wideband CDMA (W-CDMA) system, the BTSs in soft handoff will decode packets or frames (hereinafter referred to as frames) transmitted by the MS. There can be a maximum of six (6) base stations in soft handoff. The quality information on the decoded frames is transmitted from the BTS up to the Radio Network Controller (RNC) or Selection Distribution Unit (SDU). The RNC selects the frame received from the BTS with the highest quality. Quantitatively, soft-handoff improves the capacity/coverage in a CDMA system.

Figure 1:
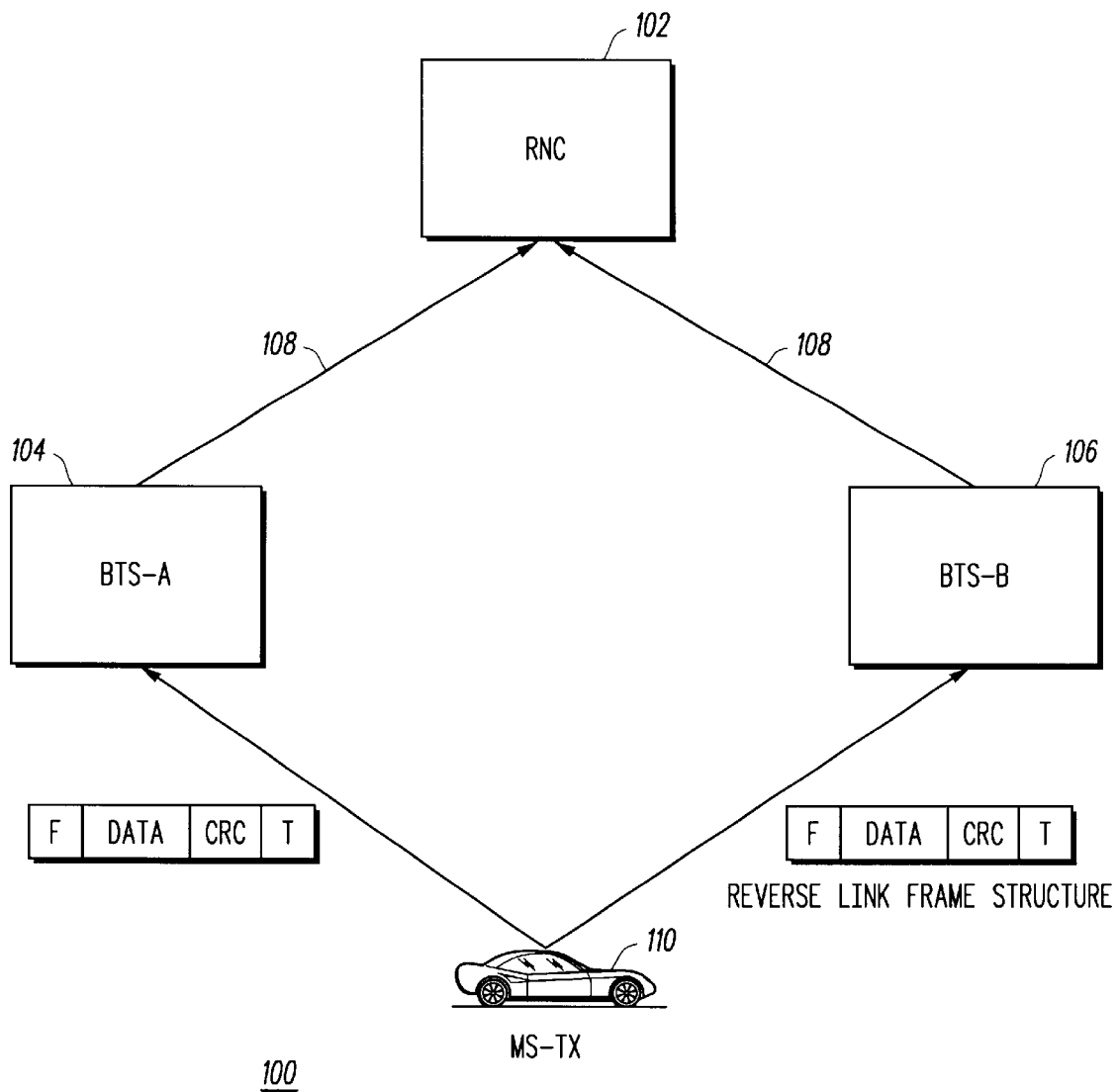
FIG. 1 is a block diagram of a communication system that can implement the reverse link soft handoff using H-ARQ method of the present invention.

Referring to FIG. 1, a block diagram of a communication system in accordance with the preferred embodiment of the present invention is shown. In the preferred embodiment, the communication system 100 includes an RNC 102 coupled to a first BTS 104 and a second BTS 106 through a 3GPP TSG UTRAN Iub Interface 108 (Iub Interface). The Iub interface 108 is described in Specification #3GTS25.430, v3.2.0, General Aspects and Principles. The first BTS 104 and the second BTS 106 are coupled to a MS 110. A BTS and MS that can be used with the present invention are available from Motorola, Inc. of Arlington Heights, Ill. An RNC that can be used with the present invention can be purchased from several sources, such as, Alcatel of France and Nortel of Dallas, Tex. As will be described herein, during reverse link communications, the MS 110 transmits frames $P_{n,m}$ to the BTSs 104 and 106. In the chosen nomenclature, n refers to the frame number and m refers to the number of times the same frame has been transmitted from the MS 110 to a BTS 104 or 106. For example, $P_{1,2}$ refers to the first frame which is transmitted from the MS 110 to a BTS 104 or 106 for a second time (retransmitted).

The structure of the frames, as shown in FIG. 1, includes: (1) a flush (F) bit which indicates to the BTS when to combine a current frame with a previously stored frame or to flush the current buffer; (2) data; (3) a cyclic redundancy check (CRC) bit which indicates whether a frame decoded successfully or not (i.e., whether the frame contained any errors); and (4) a tail bit (T) for flushing the channel decoder memory. The information contained in the frame is referred to herein as soft information. In accordance with the invention, the BTSs 104 and 106 will combine frames from multiple re-transmissions using an H-ARQ scheme.

In the presently preferred embodiment, after receiving a frame $P_{1,1}$ from the MS 110, the BTSs 104 and 106 will process the frame and communicate to the MS 110 over a forward control channel whether the frame contained any errors. If both BTSs 104 and 106 communicate that the frame contains errors, the MS 110 will retransmit the same frame $P_{1,2}$ to both BTSs 104 and 106 with the F bit set to instruct the BTSs 104 and 106 to combine the retransmitted frame $P_{1,2}$ with the original stored frame $P_{1,1}$. If only one or none of the BTSs 104 or 106 communicates that the frame $P_{1,1}$ contains errors, the MS 110 will transmit the next frame $P_{2,1}$ to the BTSs 104 and 106 with the F bit set to instruct both BTSs 104 and 106 to erase the previous frame $P_{1,1}$ from memory and not to combine the previous frame with the current frame $P_{2,1}$. The preferred embodiment of the method of the present invention will be described in more detail with reference to the flow chart of FIG. 2.

Figure 2:
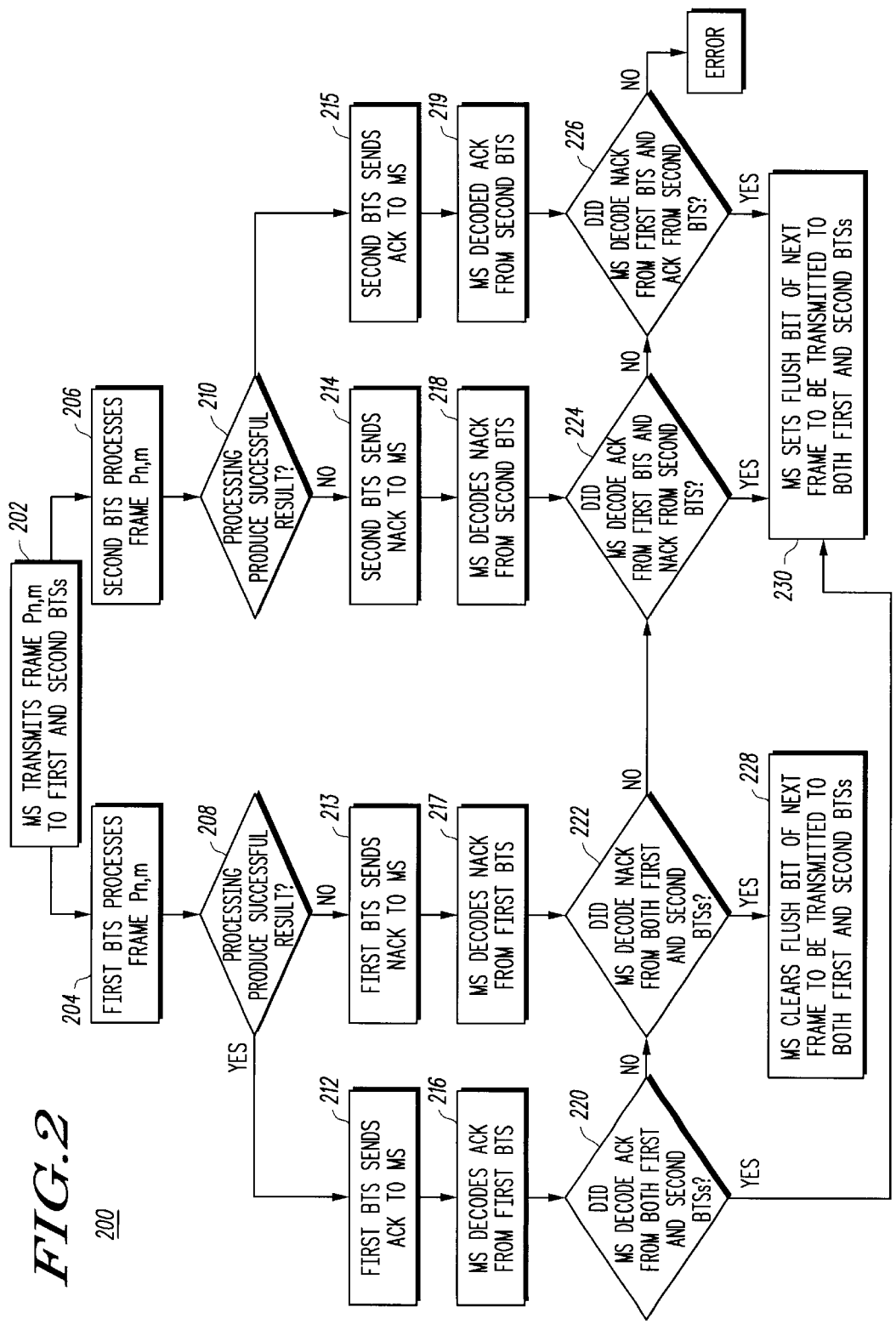
FIG. 2 is a flow chart of the soft handoff method of the present invention.

FIG. 2 is a flow chart of the preferred embodiment of the reverse link soft-handoff method of the present invention. The flow chart consists of four cases: (1) both BTSs successfully decode the frame transmitted by the MS (no errors are detected); (2) both BTSs decode the frame in error; (3) the first BTS decodes the frame successfully and the second BTS decodes the frame in error; and (4) the first BTS decodes the frame in error and the second BTS successfully decodes the frame.

Figure 3:
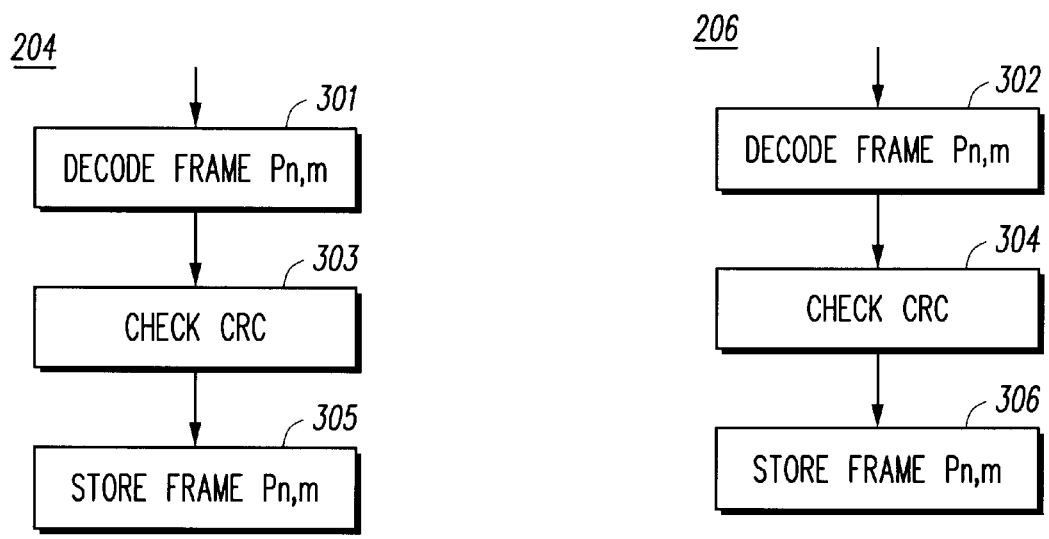
FIG. 3 is a flow chart of the processing block in the flow chart of FIG. 2

Starting with case 1, at block 202 the MS 110 transmits frame $P_{n,m}$, in the present example $P_{1,1}$ to the first BTS 104 and the second BTS 106. At block 204, the first BTS 104 processes the frame $P_{1,1}$. In the preferred embodiment as shown in FIG. 3, the BTS 104 decodes frame $P_{1,1}$ (block 301), checks the CRC which is a quality indicator for the frame $P_{1,1}$ (block 303) and stores the frame $P_{1,1}$ (block 305). The CRC quality indicator indicates whether there are any errors in the frame. Referring back to FIG. 2, at block 206, the second BTS 106 also processes the frame $P_{1,1}$. In the preferred embodiment as shown in FIG. 3, BTS 106 decodes frame $P_{1,1}$ (block 302), checks the CRC for the frame $P_{1,1}$ (block 304) and stores the frame $P_{1,1}$ (block 306). Next, in decision blocks 208 and 210, both the first BTS 104 and the second BTS 106 determine whether the processing frame $P_{1,1}$ was successfully decoded or not). If both BTSs 104 and 106 successfully decoded the frame $P_{1,1}$ both BTSs 104 and 106 send a success message, in the preferred embodiment an ACK, to the MS 110 (blocks 212 and 215). The MS 110 then decodes the ACKS sent from the BTSs 104 and 106 (blocks 216 and 219) and then determines at decision block 220 whether ACKs were decoded from both BTSs 104 and 106. Since, in case 1, ACKS were decoded from both BTSs 104 and 106, the MS sets the flush bit (F=1) of the next frame $P_{2,1}$ to be transmitted to both BTSs 104 and 106 (block 230). Setting the F bit to "1" instructs the BTSs 104 and 106 not to combine the stored frame $P_{1,1}$ with the next frame $P_{2,1}$ it receives. Thus, the BTSs 104 and 106 will clear frame $P_{1,1}$ from memory.

In case 2, steps 202, 204 and 206 are performed as stated above. At decision blocks 208 and 210, both BTSs 104 and 106, determine that the frame $P_{1,1}$ decoded in error. At blocks 213 and 214, the BTSs 104 and 106 send an error message, in the preferred embodiment a NACK, to the MS 110. The MS 110 then decodes the NACKs at blocks 217 and 218. Flow then continues through the "no" path of decision block 220 to decision block 222. At decision block 222, the MS determines that it decoded NACKS from both BTSs 104 and 106 and clears the flush bit (F=0) for the next frame $P_{2,1}$ (retransmission of first frame) to be transmitted to both BTSs 104 and 106 (block 228). Clearing F instructs the BTSs 104 and 106 to combine the stored frame $P_{1,1}$ with the next frame $P_{2,1}$ it receives. Thus, the BTSs 104 and 106 will not clear frame $P_{1,1}$ from memory. In case 2, the described process of decoding frames unsuccessfully, storing the unsuccessful frames, retransmitting the unsuccessful frames and combining the unsuccessful frames will continue until at least one of the BTSs 104 or 106 decodes a frame successfully or until a preset timeout period is reached. In accordance with the invention, the BTSs 104 and 106 will use one of the H-ARQ schemes, such as that previously disclosed, to combine the frames.

In case 3, steps 202, 204 and 206 are performed as stated for case 1 above. At decision block 208, the first BTS 104 determines that frame $P_{1,1}$ decoded successfully. At decision block 210, the second BTS 106 determines that frame $P_{1,1}$ decoded in error. At block 212, the first BTS 104 sends an ACK to the MS 110. At block 214, the second BTS 106 sends a NACK to the MS 110. At block 216, MS 110 decodes the ACK sent from the first BTS 104 and at block 218 decodes the NACK sent from the second BTS 106. Flow continues through the "no" paths of decision blocks 220 and 222 to decision block 224. At decision block 224, the MS 110 determines that it decoded an ACK from the first BTS 104 and a NACK from the second BTS 106. In block 230, the MS sets the F bit of the next frame $P_{2,1}$ to one (F=1). Since one of the BTSs 104 decoded frame $P_{1,1}$ successfully, both BTSs 104 and 106 will erase frame $P_{1,1}$ from memory and will not combine the next frame $P_{2,1}$ with frame $P_{1,1}$.

In case 4, steps 202, 204 and 206 are performed as stated for case 1 above. At decision block 208, the first BTS 104 determines that frame $P_{1,1}$ decoded in error. At decision block 210, the second BTS 106 determines that frame $P_{1,1}$ decoded successfully. At block 213, the first BTS 104 sends a NACK to the MS 110. At block 215, the second BTS 106 sends an ACK to the MS 110. At block 217, MS 110 decodes the NACK sent from the first BTS 104 and at block 219 decodes the ACK sent from the second BTS 106. Flow continues through the "no" paths of decision blocks 220, 222 and 224 to decision block 226. At decision block 226, the MS 110 determines that it decoded a NACK from the first BTS 104 and an ACK from the second BTS 106. In block 230, the MS sets the F bit of the next frame $P_{2,1}$ to one (F=1). Since one of the BTSs 106 decoded frame $P_{1,1}$ successfully, both BTSs 104 and 106 will erase frame $P_{1,1}$ from memory and will not combine the next frame $P_{2,1}$ with frame $P_{1,1}$.

In all four cases described above, after the BTSs 104,106 process the frames received from the MS 110, the BTSs will transmit the frames to the RNC 102 along with a quality indicator for the frame. The RNC will choose the frame with the highest quality. Combining H ARQ with soft handoff provides several advantages which include increase in capacity or throughput, increase in coverage and longer mobile station battery life.

Those skilled in the art will recognize that various modifications and variations can be made in the apparatus of the present invention and in construction of this apparatus without departing from the scope or spirit of this invention. For example, the method of the present invention can be implemented in a communications system that includes more than two base stations.

What is claimed is:

1. A method of implementing soft handoff using hybrid ARQ comprising the steps of:
   a. providing a plurality of base stations in communication with at least one RNC and in communication with a mobile station;
   b. transmitting a frame $P_{n,m}$ from the mobile station to a first of the plurality of base stations and to a second of the plurality of base stations;
   c. at the first and second of the plurality of base stations, processing the frame $P_{n,m}$; and
   d. at the mobile station, determining whether to retransmit the frame $P_{n,m}$ or whether to transmit a next frame $P_{n+1,m}$ to the first and second of the plurality of base stations, wherein if the decision is to retransmit frame $P_{n,m}$, transmitting frame $P_{n,m+1}$ and at the first and second of the plurality of base stations, combining frame $P_{n,m}$ with frame $P_{n,m+1}$ using H-ARQ and if the decision is to transmit the next frame $P_{n+1,m}$, transmitting the next frame to the first and second of the plurality of base stations.

2. The method of claim 1 wherein the step of processing the frame $P_{n,m}$ comprises the step of decoding the frame $P_{n,m}$ at the first and second of the plurality of base stations.

3. The method of claim 1 wherein the step of processing the frame $P_{n,m}$ comprises the steps of at the first of the plurality of base stations, determining a first quality measure indicating whether there are any errors in the frame $P_{n,m}$ and at the second of the plurality of base stations, determining a second quality measure indicating whether there are any errors in the frame $P_{n,m}$.

4. The method of claim 3 wherein the step of determining a first quality measure comprises checking a first CRC.

5. The method of claim 3 wherein the step of determining a second quality measure comprises checking a second CRC.

6. The method of claim 1 wherein the step of processing the frame $P_{n,m}$ comprises the steps of storing soft information of the frame $P_{n,m}$.

7. The method of claim 6 wherein the step of determining whether to retransmit the frame $P_{n,m}$ or whether to transmit a next frame $P_{n+1,m}$ to the first and second of the plurality of base stations comprises deciding to transmit the next frame $P_{n+1,m}$ if at least one of the first or second of the plurality of base stations decoded frame $P_{n,m}$ correctly.

8. The method of claim 7 further comprising the step of the mobile station setting a flush bit to "1", wherein the flush bit set to "1" instructs the first and second of the plurality of base stations to clear the soft information of frame $P_{n,m}$ from memory.

9. The method of claim 8 further comprising the step of erasing the soft information of frame $P_{n,m}$ at the first and second of the plurality of base stations.

10. The method of claim 1 wherein the step of determining whether to retransmit the frame $P_{n,m}$ or whether to transmit a next frame $P_{n+1,m}$ to the first and second of the plurality of base stations comprises the steps of deciding to retransmit the frame $P_{n,m}$ if neither of the base stations decoded the frame $P_{n,m}$ correctly and setting a flush bit to "0" to instruct the first and second of the plurality of base stations to combine frame $P_{n,m}$ with a retransmitted frame $P_{n,m+1}$.

11. The method of claim 3 further comprising the step of transmitting the frame Pn,m from the first and second of the plurality of base stations to the RNC along with the first quality measure and the second quality measure.

12. The method of claim 1 further comprising the step of the RNC choosing the frame $P_{n,m}$ having a quality measure indicating that the frame $P_{n,m}$ has no errors.

13. The method of claim 1 wherein between steps c. and d. the method includes the step of the first and second of the plurality of base stations sending a success message to the mobile station if the frame $P_{n,m}$ processed without errors and sending an error message to the mobile station if the frame $P_{n,m}$ processed with errors.

14. The method of claim 13 wherein the base station success message sent to the mobile station is an acknowledgement bit.

15. The method of claim 13 wherein the base station success message sent to the mobile station is a negative acknowledgement bit.

16. A method of implementing soft handoff using hybrid ARQ comprising the steps of:
   a. providing a plurality of base stations in communication with at least one RNC and in communication with a mobile station;
   b. transmitting a frame $P_{n,m}$ from the mobile station to a first and second of the plurality of base stations;
   c. at the first and second of the plurality of base stations, decoding the frame $P_{n,m}$;
   d. at the first and second of the plurality of base stations, determining a first and second quality measure, respectively, indicating whether there are any errors in the frame $P_{n,m}$;
   e. at the first and second of the plurality of base stations, storing the frame $P_{n,m}$; and
   f. at the mobile station, determining whether to retransmit the frame $P_{n,m}$ or whether to transmit a next frame $P_{n+1,m}$ to the first and second of the plurality of base stations, wherein if the decision is to retransmit frame $P_{n,m}$, transmitting frame $P_{n,m+1}$, and at the first and second of the plurality of base stations, combining frame $P_{n,m}$ with frame $P_{n,m+1}$ using H-ARQ and if the decision is to transmit the next frame $P_{n+1,m}$, transmitting the next frame to the first and second of the plurality of base stations.

17. The method of claim 15 wherein the step of determining a first quality measure comprises checking a first CRC.

18. The method of claim 15 wherein the step of determining a second quality measure comprises checking a second CRC.

19. The method of claim 15 wherein the step of determining whether to retransmit the frame $P_{n,m}$ or whether to transmit a next frame $P_{n+1,m}$ to the first and second of the plurality of base stations comprises deciding to transmit the next frame $P_{n+1,m}$ if at least one of the first and second of the plurality of base stations decoded frame $P_{n,m}$ correctly and setting a flush bit to "1" to instruct the first and second of the plurality of base stations to clear frame $P_{n,m}$ from memory.

20. The method of claim 15 wherein the step of determining whether to retransmit the frame $P_{n,m}$ or whether to transmit a next frame $P_{n+1,m}$ to the first and second of the plurality of base stations comprises deciding to retransmit the frame $P_{n,m}$ if neither of the first and second of the plurality of base stations decoded the frame $P_{n,m}$ correctly and setting a flush bit to "0" to instruct the first and second of the plurality of base stations to combine frame $P_{n,m}$ with a retransmitted frame $P_{n,m+1}$.

21. The method of claim 15 further comprising the step of transmitting the frame $P_{n,m}$ from the first and second of the plurality of base stations to the RNC along with the first quality measure and second quality measure.

* * * * *